June 17, 1930.   A. PATEMAN   1,764,224
PLATEN ROLLER CLUTCH FOR TYPEWRITERS
Filed Sept. 3, 1927

INVENTOR
Arthur Pateman
BY
Watson, Coit, Morse & Grindle.
ATTYS.

Patented June 17, 1930

1,764,224

UNITED STATES PATENT OFFICE

ARTHUR PATEMAN, OF LEICESTER, ENGLAND, ASSIGNOR OF ONE-HALF TO IMPERIAL TYPEWRITER COMPANY LIMITED, OF LEICESTER, ENGLAND, A BRITISH COMPANY

PLATEN-ROLLER CLUTCH FOR TYPEWRITERS

Application filed September 3, 1927, Serial No. 217,459, and in Great Britain October 2, 1926.

This invention is for improvements in or relating to typewriters of the type wherein the platen-roller is driven by finger-operated mechanism through the medium of a rotating member (generally the line spacing ratchet) and a clutch located operatively intermediate said rotating member and the platen-roller. It is the object of the present invention to provide an improved form of such clutch (hereinafter referred to as the "platen-roller clutch") and for the sake of brevity the said rotating member by which the platen roller is driven will be hereinafter referred to as the "driver".

According to the present invention, there is provided, in or for a typewriter, a platen-roller clutch consisting of two clutch-elements which are carried one upon the platen-roller and the other upon the driver and which are constituted one by a cylindrical ring of minutely fine teeth and the other by one or more dogs which are correspondingly toothed on their engaging faces and are mounted upon the part carrying them in such a manner as to be movable radially of the ring of teeth, or substantially so, into and out from intermeshing engagement with said ring, and means to effect at will the engagement and disengagement of the dogs with the ring of teeth.

Platen-roller clutches are known comprising a toothed ring as one of the clutch-elements and one or more dogs constituting the other clutch-element, the dogs being each formed with a single tooth for engagement with the teeth of the ring. The present invention however is essentially distinguished from such known forms in that it enables extremely fine angular adjustment to be effected, indeed almost infinite adjustment as distinct from step-by-step adjustment, and with this in view, the teeth of the ring of teeth are of minutely fine dimensions and the dogs are each toothed, not with a single tooth, but with a plurality of correspondingly fine teeth. In this connection, it is to be appreciated that the invention does not consist in the mere substitution of dogs which are formed with a plurality of teeth for the single toothed dogs of the known constructions, but rather in the provision, for the purpose stated above, of toothed relatively engaging elements which are formed with teeth of extremely minute dimensions (e. g. 76 teeth to the inch as in the example hereinafter given).

According to a feature of the invention the dogs are so mounted (for example to pivot in a general plane or planes which are parallel or substantially so with the particular teeth of the ring to be engaged by the dogs) as to move in a direction such, in relation to the ring of teeth, that the teeth of each dog all intermesh simultaneously with the teeth of the ring. In virtue of this feature, the clutch action is rendered more initially positive than would be the case were the dogs so movable in relation to the ring of teeth that the teeth on the dogs intermeshed successively with the ring of teeth.

According to a further feature of the invention the dogs may be yieldingly controlled in the direction to engage the dogs with the ring of teeth. In virtue of this feature, should any wear of the teeth occur, such wear will not involve an imperfect intermesh between the teeth; the spring control will at all times maintain the dogs in proper contact with the ring of teeth.

The invention will now be further described with reference to the accompanying drawing which illustrates one embodiment by way of example.

In the drawings:—

Like reference numerals indicate like parts throughout the various figures.

Figure 1:
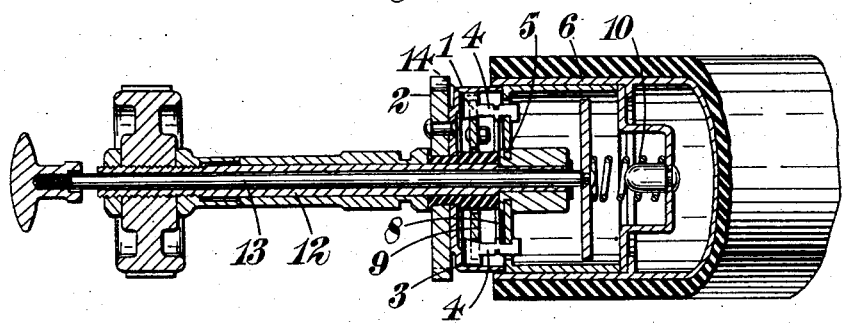
Figure 1 is a longitudinal section through the clutch and its associated parts.
Figure 2:
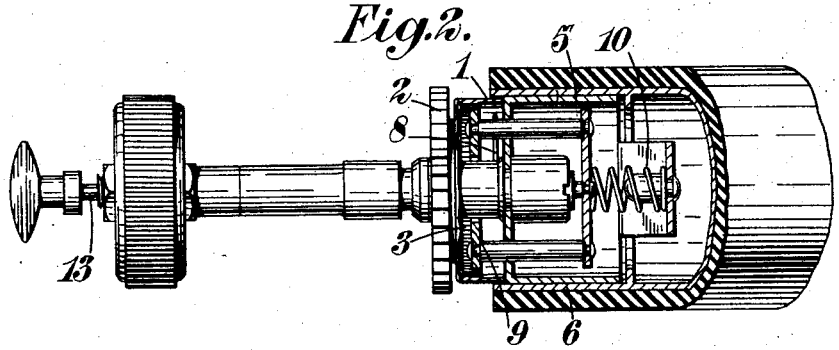
Figure 2 is partly a longitudinal section and partly an external elevation in a plane at right angles to the plane of the section of Figure 1.
Figure 3:
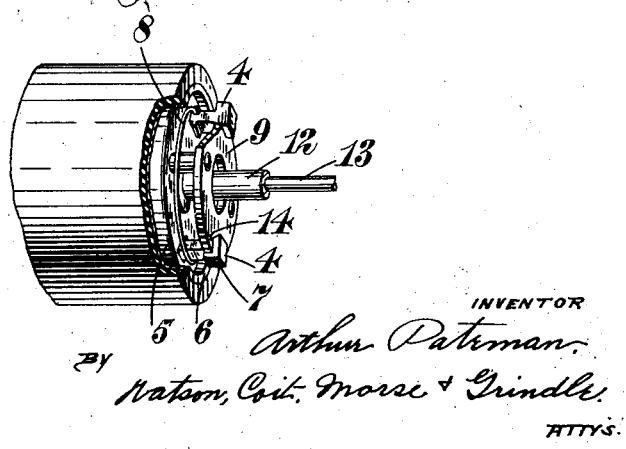
Figure 3 is a perspective end view of the interior of the clutch with certain parts broken away.

The clutch comprises two elements, one of which is a cup-shaped member 1 carried coaxially upon the ratchet wheel 2 and provided on its internal wall with an annular ring of fine teeth 3. The teeth number 76 to the inch and the depth of the ring of teeth in the direction of the length of the teeth is approximately ⅛th of an inch. The other element of the clutch consists of two small dogs 4 pivoted in the end face of a cylindrical cup-shaped element 5 inserted into the end of the platen roller 6. The dogs project from said end face into the cup-shaped member 1 and are formed with fine teeth 7 on the outer extremity of their radially outermost faces corresponding to the fine teeth 3 of the internal wall of said cup-shaped member. The dogs are positioned diametrically opposite one another and are arranged to pivot in planes which are radial to the axis of rotation of the roller. The dogs, moreover, are spring-controlled in a radially inward direction by means of a ring of resilient wire 8 slipped over and surrounding the dogs and bearing radially inwardly upon them by its resilience.

The dogs are arranged to be yieldingly controlled into engagement with the ring of teeth 3 by the cam action of a cam disc 9. Said cam disc is a circular plate disposed transverse to the axis of rotation of the platen roller and located radially within the set of dogs so as, under its yielding control 10, to bear outwardly upon the radially innermost faces of the dogs against the light yielding control of the resilient wire ring 8 surrounding them. The disc 9 is slidable longitudinally of the platen so as to force the dogs radially outward about their pivots by movement of the disc towards the cup-shaped member 1; the dogs being suitably formed for this cam action of the disc. The formation of the dogs is also such that as the cam disc is moved in the reverse direction, i. e. away from the cup-shaped member, the dogs move inwardly under their light wire spring control out of intermeshing engagement with the ring of teeth on the cup-shaped member.

The platen roller spindle 12, which is tubular, projects from the end of the platen roller and provides a bearing in the usual way for the line-spacing ratchet wheel 2, and the cam disc 9 is arranged to be moved in the direction to disengage the clutch dogs from the ring of teeth on the cup-shaped member by means of an operating rod 13 passing axially through the platen roller spindle. The cam disc is arranged to be moved in the direction to engage the dogs on said ring of teeth by a compression spring 10 contained within the aforesaid cylindrical chamber 5 in the end of the platen roller, this compression spring being of course more powerful than the light yielding control spring 8 surrounding the clutch dogs.

The cam disc 9 is preferably formed with notches 14 around its periphery to receive the dogs and provide lateral support for the dogs. The dogs are thereby supported against such lateral movement, due to the drive of the ring of teeth, as would twist them about their pivots and remove their teeth out of parallelism with the teeth of the ring of teeth.

Various constructional differences may, of course, be made without departing from the spirit of the invention.

I claim:

1. In a clutch, the combination with a rotatable hollow shaft, of a disc mounted rigidly on said shaft, a member mounted loosely on said shaft, a dog pivoted at one end in said disc about an axis transverse to the axis of rotation of said shaft, an element slidable axially of said shaft and engaging said dog to move the latter into clutching engagement with said member, a second shaft disposed within said hollow shaft, and means extending through said disc for rigidly connecting said second shaft to said element.

2. In a clutch for connecting two coaxial rotatable elements, the combination with an internally toothed cup carried by one of said elements, dogs supported for pivotal movement in planes containing the axis of said elements, fulcrum seatings in the other of said elements upon which the dogs rest and about which they pivot, a portion of each dog extending into said cup and provided with teeth for engagement with the internal teeth on the cup, a wedging member disposed within the cup transversely to the axis of the said elements and notched at its periphery to receive the dogs at their free end, the latter resting upon the bottoms of the notches and being supported laterally by the walls of the notches, which wedging member is non-rotatable in relation to the said elements, but is slidable axially thereof, and is arranged by movement in one direction to cam the dogs outwardly into engagement with the cup, and by movement in the reverse direction to allow the dogs to recede inwardly from engagement with the cup, a resilient ring encircling the dogs within the cup and, by bearing inwardly upon them, holding them all in position within the notches and upon the fulcrum seatings aforesaid and serving to control the dogs out from engagement with the cup, means positively to move the wedging member in the direction in which the dogs can recede from engagement with the cup, and a yielding control arranged to return the wedging member and cause it to cam the dogs into engagement with the cup.

3. A clutch as claimed in claim 2, wherein the wedging member is in the form of a plate, the dogs being cam-shaped where they are engaged by it.

In testimony whereof I affix my signature.

ARTHUR PATEMAN.